United States Patent [19]

Cuk et al.

[11] 4,274,133
[45] Jun. 16, 1981

[54] DC-TO-DC CONVERTER HAVING REDUCED RIPPLE WITHOUT NEED FOR ADJUSTMENTS

[75] Inventors: Slobodan M. Cuk, Huntington Beach; Robert D. Middlebrook, Pasadena, both of Calif.

[73] Assignee: California Institute of Technology, Pasadena, Calif.

[21] Appl. No.: 50,179

[22] Filed: Jun. 20, 1979

[51] Int. Cl.$^3$ ............................................. H02J 1/02
[52] U.S. Cl. ...................................... 363/39; 363/20; 363/45
[58] Field of Search ...................... 363/16, 20, 39, 40, 363/45, 124, 131

[56] References Cited
U.S. PATENT DOCUMENTS

| | | | |
|---|---|---|---|
| 4,172,277 | 10/1979 | Pinson | 363/124 |
| 4,186,437 | 1/1980 | Cuk | 363/16 |

*Primary Examiner*—William M. Shoop
*Attorney, Agent, or Firm*—Freilich, Hornbaker, Wasserman, Rosen & Fernandez

[57] ABSTRACT

A switching dc-to-dc converter employs inductance in series with the source to form an input circuit, and in series with the load to form an output circuit. Suitable switching means alternately connects an energy transfer capacitance in series in the input circuit and in the output circuit. The inductance may be provided by separate windings coupled to form a transformer. To reduce switching ripple in the input circuit, or output circuit, the transformer may be provided with an imbalance of leakage inductance in the primary winding and the secondary winding. The imbalance may be inherent in the design of the transformer, or in the design of the transformer core. In the case of tightly coupled inductances in the transformer, an equivalent imbalance may be achieved by a separate, external inductor connected in series in the input circuit, or the output circuit. In the case of using a separate inductor in series with the source in the input circuit, or the load in the output circuit, the transformer may be replaced with a single inductance. Such a single inductance may be used alone, or with other inductance in series with the load circuit or the input circuit to provide a converter also with an imbalance in the switching current ripple.

13 Claims, 17 Drawing Figures

ALL TRANSFORMERS TIGHTLY COUPLED

DC-TO-DC CONVERTER HAVING REDUCED RIPPLE WITHOUT NEED FOR ADJUSTMENTS

BACKGROUND OF THE INVENTION

This invention relates to dc-to-dc converters, and more particularly to practical extensions or variations of the new optimum topology switching converter and its coupled inductor version disclosed in U.S. Pat. No. 4,184,179 by Slobodan M. Ćuk and Robert D. Middlebrook.

In the new switching dc-to-dc converter disclosed in the aforesaid application, two inductances are employed, one in series with the source in an input circuit, and the other in series with the load in an output circuit. An energy transferring capacitance couples the input and output circuits together with one terminal of the capacitance connected to the input circuit and the other terminal of the capacitance connected to the output circuit. The other terminals of the input and output circuits are connected to a common junction. Suitable switching means are provided for alternately connecting the capacitance in series with the input and output circuits, thereby achieving dc-to-dc conversion. The outstanding performance of this converter is that both input and output currents are non-pulsating, although a small switching ripple does appear on their dc (average) values.

Simplification of this new switching converter topology and further improvement of its performance are obtained by coupling the inductors into a single magnetic circuit with two windings as described in detail in the aforesaid application. The coupling of inductances leads to at least a reduction to half of both current ripples. It was also snown that even zero current ripple in either the input or output circuit may be obtained when the transformer (coupled inductors) is adjusted for the condition $n=k$, where n is equal to the square root of the ratio of the self inductances $L_1$ and $L_2$ of the input and output windings, and k is the coupling coefficient between the two windings. However, in practice, especially when mass production and repeatability are important considerations, neither air-gap nor turns ratio adjustment is convenient for achieving the matching condition $n=k$ for zero ripple. On the other hand, one may be satisfied with a relatively large reduction in current ripple (say 100:1 or 1000:1) compared to its uncoupled value, provided the need for any special adjustment is avoided, i.e., provided a fixed air gap is used and no turns ratio adjustment is required. Several configurations which achieve these goals are presented in this application.

SUMMARY OF THE INVENTION

A switching dc-to-dc converter is provided having inductance in series with the source to form an input circuit and in series with the load to form an output circuit. Energy transfer capacitance connects the input circuit to the output circuit, and suitable switching means alternately connects an energy transfer capacitance in series in the input circuit and in series in the output circuit. The inductance may be provided by separate inductors coupled to form a transformer, or by a single inductor. To reduce switching current ripple in the input circuit, or in the output circuit, the transformer may be provided with an imbalance of leakage inductance in the primary winding, or in the secondary winding. The imbalance may be inherent in the design of the transformer, or in the design of the transformer core. In the case of tightly coupled inductances in the transformer, or in the case of a single inductance, an equivalent imbalance may be achieved by a separate, external inductor connected in series with the source in the input circuit or with the load in the output circuit, and in the case of the single inductor in place of the coupled inductors, the single inductor is connected between the switching means and a common junction in the return current paths for the input and output circuits with the separate, external inductance inserted between the input or output circuit and the end of the inductance opposite the switching means for imbalance in the switching current ripple in the input and output circuits. When isolation between the input and output circuits is desired, the energy transfer capacitance is divided into two parts and separated by an isolation transformer. In that case, coupled inductances are required, rather than a single inductance, and imbalance is achieved as in the case of nonisolated versions.

The novel features of the invention are set forth with particularity in the appended claims. The invention will best be understood from the following description when read in conjunction with the accompanying drawings.

DESCRIPTION OF PREFERRED EMBODIMENTS

In the coupled-inductor embodiment of the invention described in the aforesaid U.S. Pat. No. 4,184,179 shown in FIG. 1, the two inductors $L_1$ and $L_2$ are wound on a single core as a transformer T resulting in an inductor ripple reduction in the input circuit, comprised of a voltage source $V_g$ and inductor $L_1$ in series, and the output circuit comprised of a load R and inductor $L_2$ in series. (A filter capacitor $C_2$ may be provided in parallel with the load.) For both simplicity and ease of implementation, a turns ratio of 1:1 was chosen, although an arbitrary $N_1:N_2$ turns ratio may be included easily in the general case. The energy transferring capacitor $C_1$ couples the input and output circuits, and a switch S alternately connects a junction between the input circuit and the capacitance, and a junction between the output circuit and the capacitance, to the return current path for the load and source, thereby to alternately connect the capacitance in series with the source and in series with the load for dc-to-dc conversion.

Figure 1:
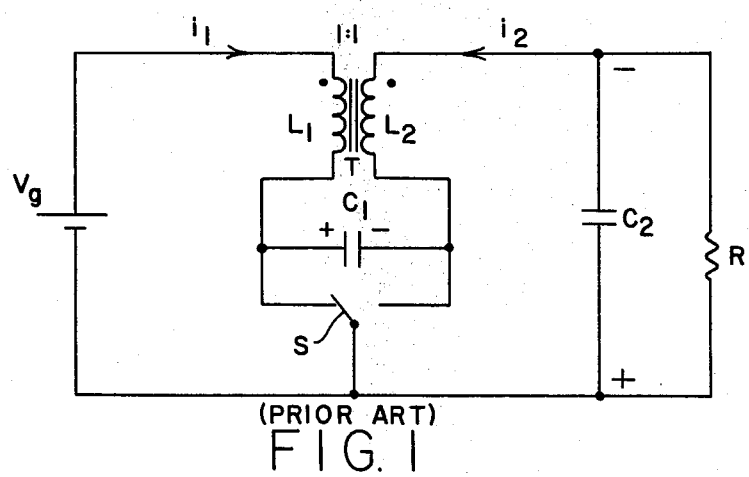
FIG. 1 is a circuit diagram of a coupled-inductor embodiment of the optimum topology dc-to-dc converter disclosed in a prior application by the present inventors.
Figure 2A:
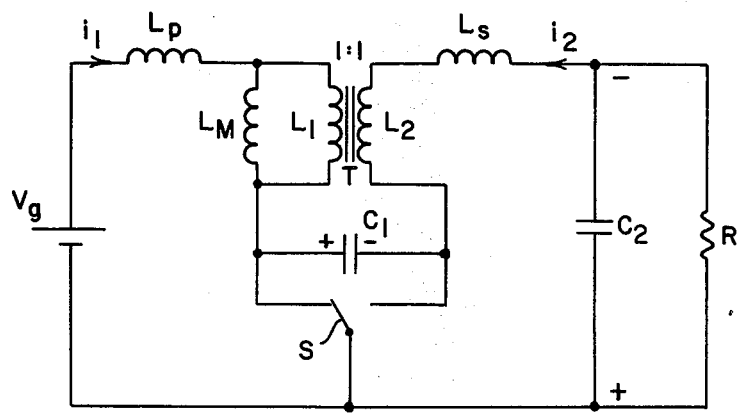
FIG. 2a is an equivalent circuit model of the coupled-inductors in the converter of FIG. 1.
Figure 2B:
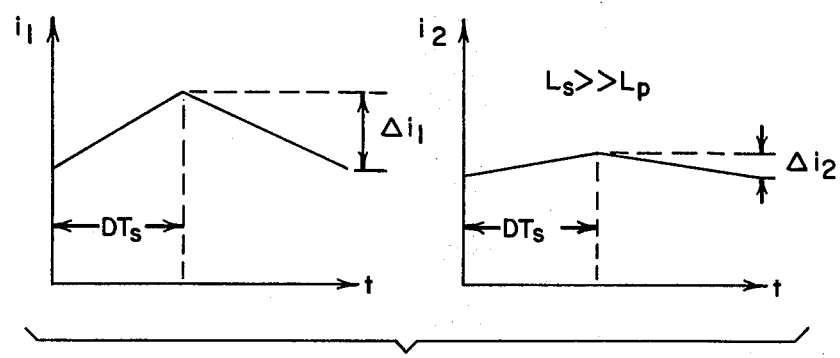
FIG. 2b illustrates the effects of secondary and primary leakage inductance with the secondary leakage inductance much greater than the primary leakage inductance for low ripple in the secondary (output) circuit.

When the transformer in the coupled-inductor embodiment of FIG. 1 is replaced by a T-equivalent circuit model, the converter model of FIG. 2a is obtained in which $L_p$ and $L_s$ are respective input and output leakage inductances of the transformer, and $L_M$ is the magnetizing inductance of the transformer. Detailed analysis of this circuit reveals that the ratio of input and output current ripple is inversely proportional to the ratio of input and output leakage inductances, i.e., $\Delta i_p/\Delta i_s \sim L_s/L_p$. Thus, the larger the secondary leakage inductance is, compared to the primary leakage inductance, the further the switching current ripple will be shifted from the output circuit to the input circuit. Hence, for $L_s >> L_p$, as shown in FIG. 2b, almost all current ripple will appear on the input circuit and approach its uncoupled ripple value, while virtually all ripple will be removed from the output. Therefore, a practical implementation of the coupled-inductor converter of FIG. 1 approaching a zero current ripple condition will be any practical implementation which results in the transformer model with extremely unbalanced equivalent inductances $L_p$ and $L_s$ in series with input source and output load.

Figure 3A:
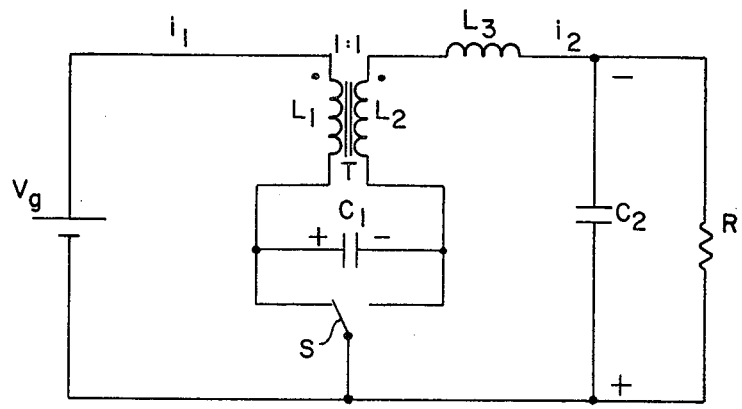
FIG. 3a is a circuit diagram of a coupled-inductor converter with additional (external) inductance in the secondary (output) circuit for low current ripple in the output circuit as shown in FIG. 3b.
Figure 3B:
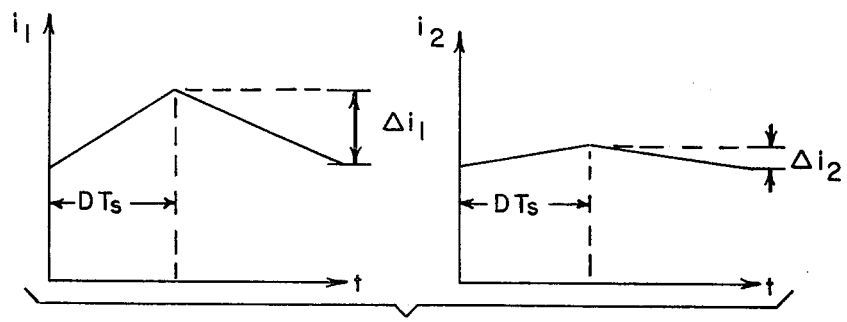
Figure 4A:
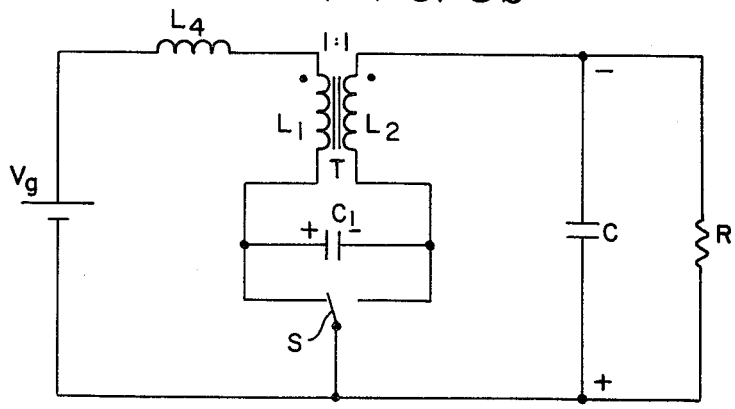
FIG. 4a is a circuit diagram of a coupled-inductor converter with additional (external) inductance in the primary (source) circuit for low current ripple in the source circuit as shown in FIG. 4b.
Figure 4B:
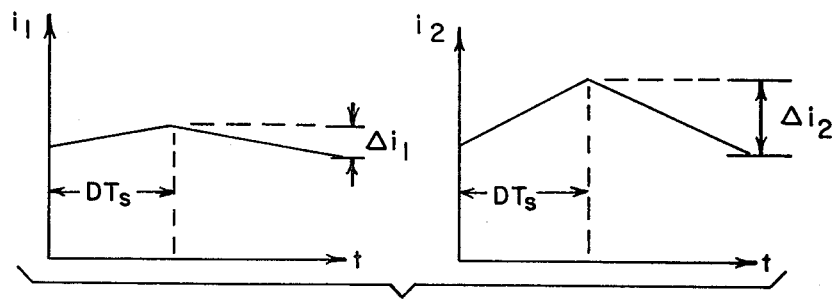

One such possible realization is shown in FIG. 3a in which, to the tightly coupled (small leakage) transformer T, an additional separate external inductance $L_3$ is added in series with its secondary winding $L_2$. Thus, in terms of the equivalent circuit model of FIG. 2a, the input series inductance $L_p$ corresponds to the very small leakage inductance of the primary winding of the tightly coupled transformer, while the output series inductor $L_s$ is effectively comprised of the external inductance $L_3$ in addition to secondary leakage inductance. The result is significant reduction of ripple in the output (load) circuit as illustrated in FIG. 3b. The external inductance $L_3$ may be relatively small since it need only be large compared to the leakage inductances $L_p$ and $L_s$ of the transformer to achieve significant current ripple reduction in the output circuit. Alternatively, if the external inductance $L_3$ is added in series with the primary winding (inductance $L_1$) of the tightly coupled transformer, significant ripple reduction is achieved in the input circuit, as shown in FIGS. 4a and 4b. Note, however, that in both cases there is no need for any adjustments in the transformer design, since it is made of equal number of turns bifilar wound for reduced leakage.

Figure 5A:
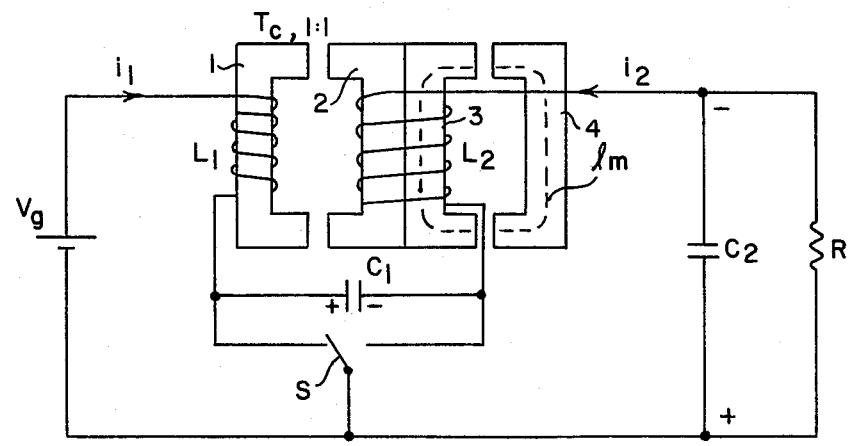
FIG. 5a is a circuit diagram of a coupled-inductor converter with single magnetic component used to realize the coupled-inductor converter of FIG. 2a, b, without any external inductance, and instead using U cores to effect a large secondary leakage inductance for low current ripple in the output circuit as shown in FIG. 5b.
Figure 5B:
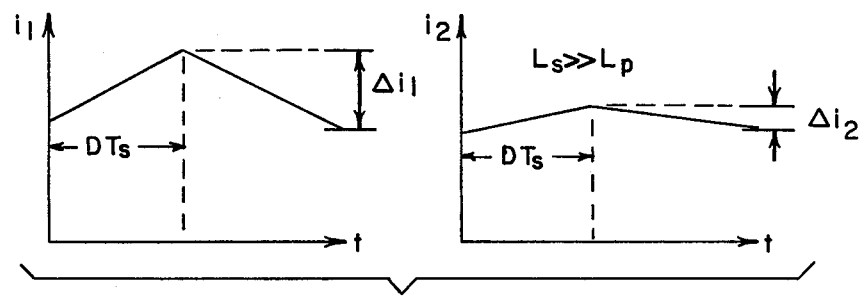
FIGS. 5c and 5d show alternative core structure using concentric toroidal cores in the case of FIG. 5c and EI cores in the case of FIG. 5d.

The same effect of extremely unbalanced current ripple reduction may be obtained by use of an appropriately designed single magnetic circuit with two windings, such as shown in FIG. 5a, instead of two magnetic components, namely a tightly coupled transformer $T_c$ and a third inductance $L_3$. The coupled-inductor transformer $T_c$ of the converter of FIG. 5a may be built by use of four U cores 1 through 4 (ferrite cores, for example). While virtually all of the flux of the primary winding $L_1$ coupled to the secondary winding $L_2$ through the cores 1 and 2 for a relatively small leakage inductance $L_p$, a significant part of the flux generated by the secondary winding $L_2$ is not coupled to the primary winding $L_1$, but is instead enclosed in an extra magnetic path $l_m$ formed by core 4 with the core 3. Therefore, the leakage inductance of the winding $L_2$ is enhanced and significantly larger than in winding $L_1$, and unbalanced current ripple reduction is achieved as shown in FIG. 5a. The air gaps shown are used to insure the appropriate dc current carrying capability of the magnetic circuit.

Figure 5C:
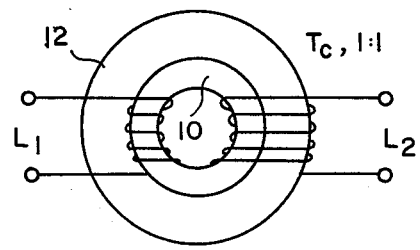

Another implementation based on the same concept is shown in FIG. 5c, but with two toroidal cores of Moly-permalloy material (i.e., MMP cores) which are normally used for making inductors. As seen from FIG. 5c, winding $L_1$ is wound only around the one core 10, while winding $L_2$ is wound around both the core 10 and another core 12. Hence, the leakage inductance of winding $L_1$ is very small (corresponding to small leakage flux in the air), but the leakage inductance of the windings $L_2$ is made large by loss of flux through the core 12, which is not coupled to the winding $L_1$.

Figure 5D:
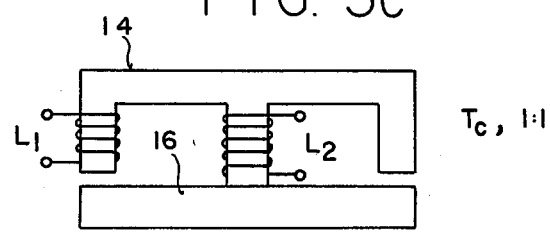

Although the transformer $T_c$ of FIG. 5a and FIG. 5c imply a two-core implementation, the same concept can be practiced by a single standard EI core comprised of an E core 14 and an I core 16 with two windings as shown in FIG. 5d. Still other ways of achieving such a transformer $T_c$ will occur to those skilled in the art, and it will be obvious that, to reduce the ripple in the input (source) circuit instead, the transformer $T_c$ may simply be turned around, i.e., the winding $L_1$ may become the winding $L_2$, and vice versa.

Figure 6:
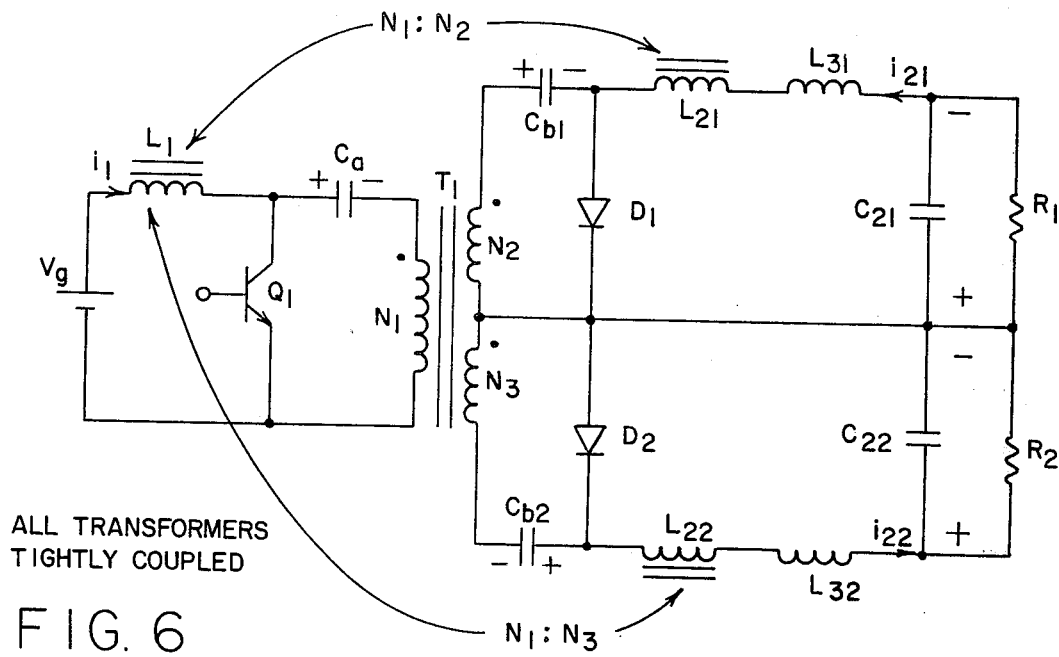
FIG. 6 illustrates one possible realization of the present invention for a coupled-inductor converter with dc isolation between the input (source) circuit and multiple output (load) circuits.

It is important to note that the aforementioned practical realizations of coupled inductors are equally applicable to the dc isolated version of the optimum topology converter, also disclosed in the aforementioned patent application, with the same current ripple reduction benefits. The only distinction is that the turns ratio of the coupled inductors needs to be scaled appropriately to correspond to the isolation transformer turns ratio, as seen from one particular example shown in FIG. 6 for multiple output circuits using an isolation transformer $T_1$ and dividing the transfer capacitance into a capacitor $C_a$ in the input circuit and a capacitor $C_b$ in the output circuit, or more particularly a separate capacitor $C_{b1}$ for one output circuit having a load $R_1$ and a separate capacitor $C_{b2}$ for the other output circuit having a load $R_2$. The same switching transistor $Q_1$ cooperates with diodes $D_1$ and $D_2$ in the two output circuits to effect the function of the switch S in the basic circuit of FIG. 1. All of the other circuit components for the two output circuits are identified by the same reference characters as in FIG. 3a, but with added subscripts 1 and 2 for the two separate output circuits. (Note that the polarity of the current in the second output circuit is reversed and that separate turns ratios are used for the coupled inductors $L_1$ and $L_{21}$, and coupled inductors $L_1$ and $L_{22}$.)

Figure 7:
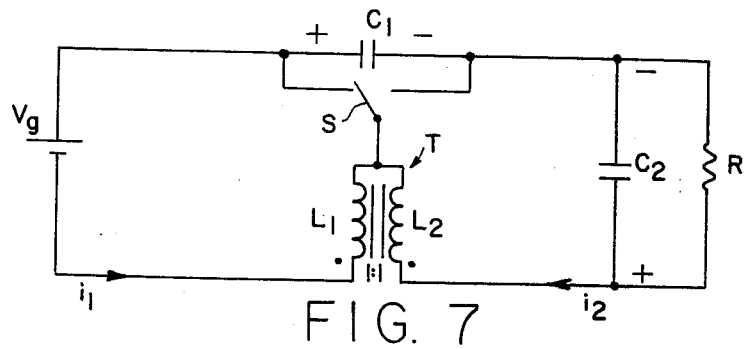
FIG. 7 illustrates the prior-art coupled-inductor converter of FIG. 1 with the coupled inductors $L_1$ and $L_2$ rearranged on the other sides of the source and load without effecting any change in the electrical operation of the circuit.
Figure 8:
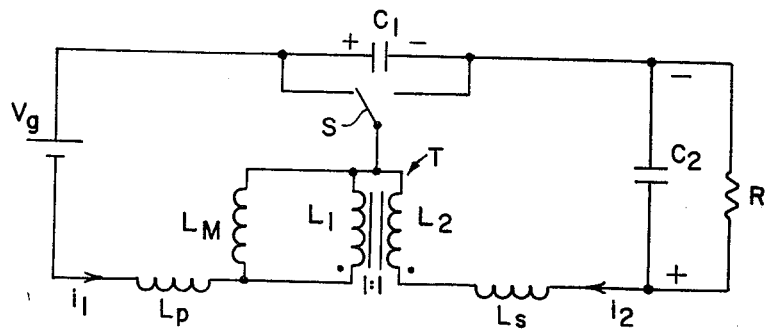
FIG. 8 is an equivalent circuit model of the converter in FIG. 7.
Figure 9A:
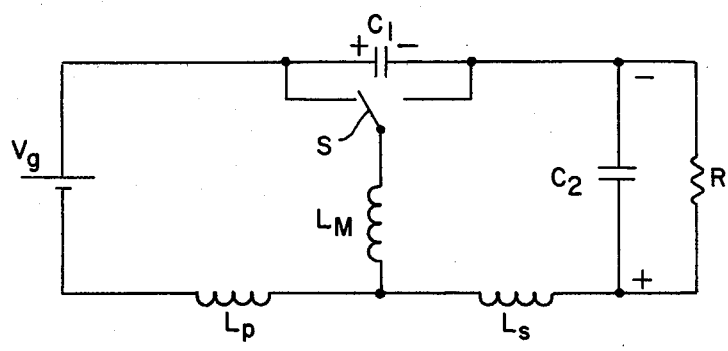
FIGS. 9a, 9b and 9c illustrate physical implementations of the coupled-inductor converter of FIG. 7 in various equivalent configurations.
Figure 9B:
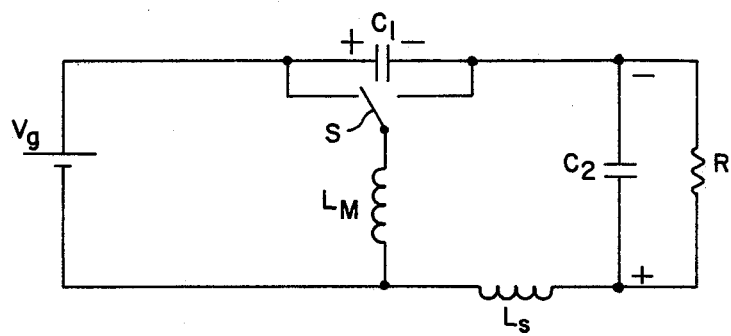
Figure 9C:
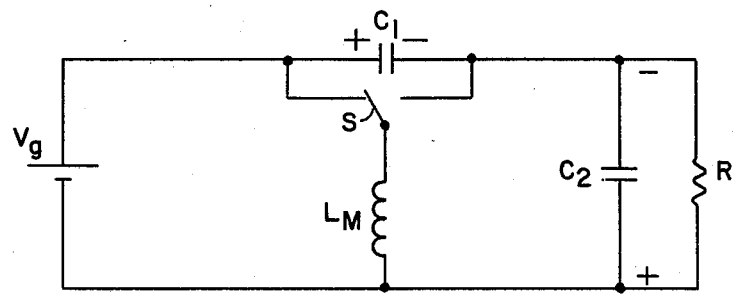

Several possible implementations result when the coupled inductor converter of FIG. 1 is redrawn, such that its input and output inductances $L_1$ and $L_2$ have a common point as shown in FIG. 7, which otherwise has the same configurational characteristic as the basic circuit of FIG. 1. The replacement of the equivalent circuit model for the coupled inductors results in the model in FIG. 8. Because the coupled-inductor configurations of FIG. 1 and FIG. 7 do not have the isolation property of the configuration of FIG. 6, the ideal 1:1 transformer T can be shorted and the remaining three-inductance model used for the physical realization of the coupled inductors, such as shown in FIG. 9a. However, when the input inductance is very small, a physical realization using two inductances is obtained as in FIG. 9b, which is another possible implementation for unbalanced current ripple reduction in the coupled-inductor converter of FIG. 7. Even the coupled inductors of FIG. 7 may be replaced by a single inductor, such as shown in 9c, just in the same way as the transformer in the conventional flyback (buck-boost) converter, may be substituted by a single inductor in its special case. It may also be desirable in the special case of the coupled-inductor converter of FIG. 9c to leave out the output capacitor $C_2$.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a switching dc-to-dc converter having: inductance in series with a voltage source to form an input circuit and in series with a load to form an output circuit, energy transfer capacitance coupling one terminal of said input circuit to a corresponding terminal of said output circuit; switching means for alternately connecting said capacitance to said input circuit in series to close a current path from the source back to the source and to said output circuit in series to close a current path from the load back to the load; and means for achieving unbalanced current ripple reduction in said input and output circuits without any adjustments required in circuit components after assembly.

2. An improvement as defined in claim 1, wherein said inductance is comprised of first and second coupled windings on a core forming a transformer, said first winding being connected in series in said input circuit and said second winding being connected in series in said output circuit, and
    said means for achieving unbalanced current ripple reduction is comprised of an inbalance of leakage inductance in said windings.

3. An improvement as defined in claim 2 wherein said imbalance of leakage inductance is inherent in the design of said transformer.

4. An improvement as defined in claim 3 wherein said imbalance of leakage inductance is in the design of the transformer core.

5. An improvement as defined in claim 1 wherein said inductance is comprised of first and second tightly coupled windings on a core forming a transformer, said first winding being connected in series in said input circuit and said second winding being connected in series in said output circuit, and said means for achieving unbalanced current ripple reduction is comprised of inductance external to said transformer windings in series with the first winding thereof for greater reduction of ripple in the input circuit, or inductance external to said transformer windings in series with the second winding thereof in the output circuit for greater reduction of ripple in the output circuit.

6. An improvement as defined in claim 5 wherein said energy transfer capacitance is divided into two capacitors coupled together by an isolation transformer having a primary winding tightly coupled to a secondary winding, said primary winding being series connected in the return current path of said input circuit, and said secondary winding being series connected in the return current path of said output circuit, thereby to produce dc isolation between said source and load.

7. A switching dc-to-dc converter having a closed series circuit comprised of a first inductance, a source, a second inductance, a load and energy transfer capacitance, said converter further having a core coupling said first and second inductances, means for alternately placing said storage capacitance in a closed series circuit with said source and said load, and means for providing unbalanced current ripple reduction in said first and second inductances without any adjustments required in circuit components after assembly.

8. An improvement as defined in claim 7 wherein said means for providing unbalanced current ripple is comprised of an imbalance of leakage inductance in the windings of said transformer.

9. An improvement as defined in claim 8 wherein said imbalance is achieved through design of the transformer core to provide an additional flux path for one winding which does not couple the other winding.

10. An improvement as defined in claim 7 wherein said means for providing unbalanced current ripple is comprised of an inductor connected in series with one winding of said transformer.

11. An improvement as defined in claim 7 wherein said transformer is replaced by a single inductor.

12. An improvement as defined in claim 11 including a second inductor connected in series in a selected one of said input and output circuits.

13. An improvement as defined in claim 11 including a second inductor connected in series in said input circuit and a third inductor connected in series in said output circuit, where said second and third inductors are selected to have inductance values that provide a predetermined imbalance in ripple currents in said input and output circuits.

* * * * *